J. B. LUCE.
Horse Rake.
No. 67,778.
Patented Aug. 13, 1867.
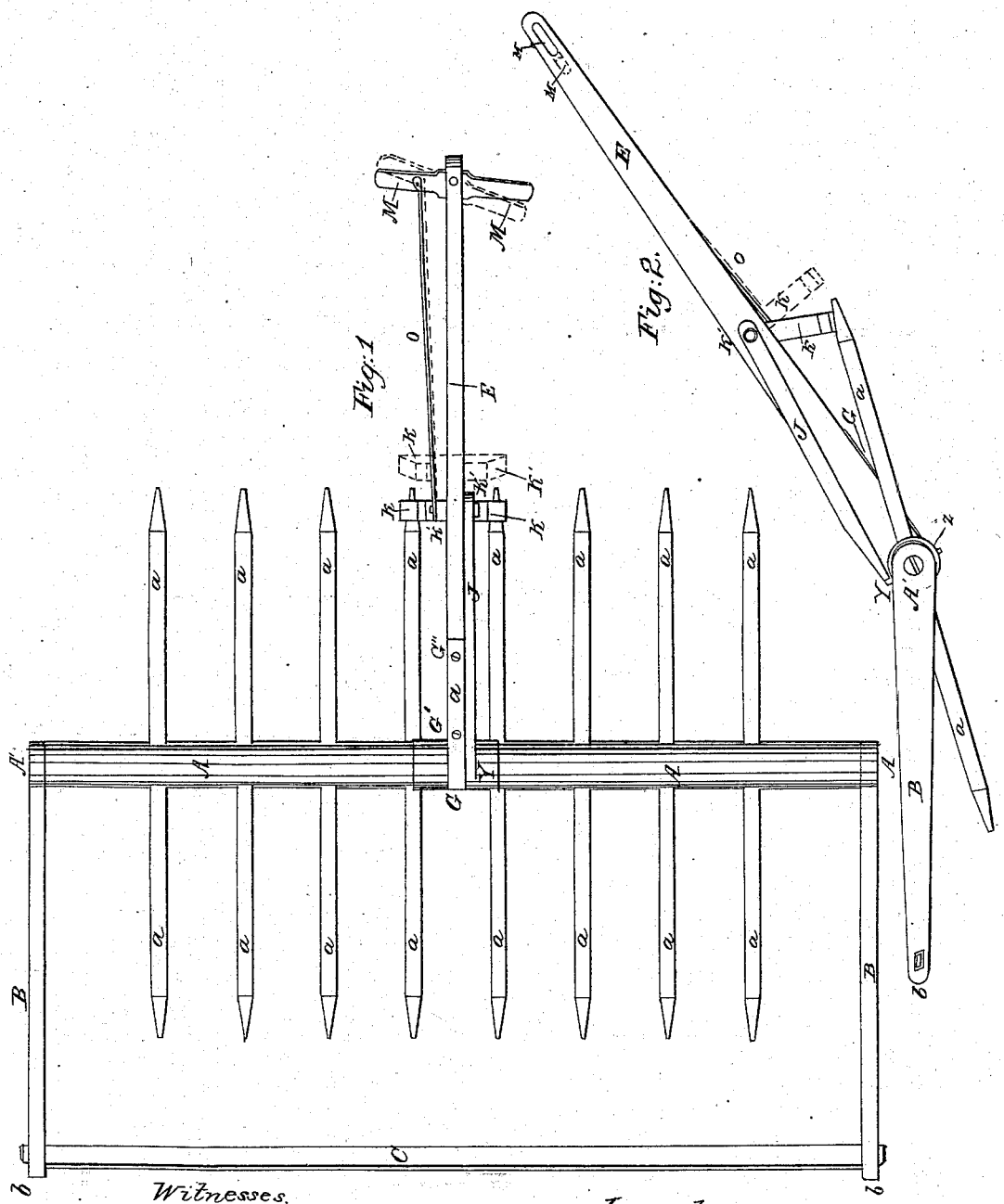

United States Patent Office.

JOHN B. LUCE, OF EARLVILLE, ILLINOIS.

Letters Patent No. 67,778, dated August 13, 1867.

IMPROVEMENT IN HORSE-RAKES.

*The Schedule referred to in these Letters Patent and making part of the same.*

TO ALL WHOM IT MAY CONCERN:

Be it known that I, JOHN B. LUCE, of Earlville, in the county of La Salle, in the State of Illinois, have invented certain new and useful Improvements in Revolving Rakes; and I do hereby declare that the following is a full and exact description thereof, reference being had to the accompanying drawings, and to the letters of reference marked thereon.

My invention consists in so adapting the governing agencies of the old, commonly used revolving rake (which has two handles attached to the revolving-shaft, with a cross-rail fixed or round between their outer ends, for the operator to take hold of) to that of a single-handled revolving rake as to diminish the cost of making, enhance its durability, and give to the operator a more precise control over the machine while attempting to accomplish the objects such an implement is intended to perform, and to not leave quite so much of said control of the machine to the option of slight inequalities of the earth, and the pulling of the draught-horse, as to the will of the attendant. It is believed that one draught animal will be sufficient to draw it, and that but one attendant will be necessary to control it. However, it will not be impossible to employ more of either, or more of both, if so desired.

To enable others skilled in the art to make and use my invention, I will proceed to describe its construction and operation by the aid of the drawings and of the letters of reference marked thereon.

The plan view of the rake in the drawings does not represent the revolving-shaft at its full length, nor, consequently, the whole number of teeth commonly used. But when the said shaft is shown at its full length it contains six more teeth—fourteen in all, with the spaces between them, and between the outside teeth and the draw-bars, the same as represented. With this exception, the representation of the rake as here given is supposed to be perfectly proportionate.

Figure 1 is a plan view, and

Figure 2 is a side elevation of the rake, with the parts applied together for use.

A is the revolving-shaft, with the teeth $a$ $a$ fixed therein. The bearings A', at the ends of A, in the form of screw-bolts, are carried in draw-bars B B, the forward ends of which latter are united by the cross-rail C, as represented. Some sort of hook, or other convenient means that can be employed for the same purpose, may be fixed upon the forward ends of B B at $b$ $b$, from which to extend a couple of trace-chains to meet the ends of the tugs. The handle E is, by means of the strap G and bolts G' and G'', fixed upon a narrow bearing, turned upon the middle of the revolving-shaft A, in such a manner as that the said shaft, together with all the parts that are intended to turn, may revolve freely, except when the same are prevented by other means, now to be described. Close by one side of the handle E, and upon the exterior of the shaft A, are fixed a couple of projections, Y and Z, one situated opposite the other, radially to the axis of the shaft A, as represented. The pawl J is bolted to one side of the handle E, and is adapted to operate against the projections Y and Z in a manner which will be obvious. In the outer end of the handle E is fixed a slight lever, M, which lever is connected to the hanger or standard K by means of the connection O. The standard or part K is suspended from the handle E by means of the bolt K' passing through its upper end, or ends, as the case may be, and is thus adapted to swing off from and on to the ends of the two teeth next to the handle E in a manner which will also be, no doubt, sufficiently obvious.

The rake slides upon the earth, with the teeth bearing very nearly a horizontal position thereto; and it will now be seen that when the rake has gathered a load, and the attendant wishes to discharge the same by a half revolution of the revolving parts, he at this juncture operates the slight lever M, throwing it into the position indicated by the red lines, which movement of the lever M, through the medium of the connection O, draws the pendant or standard K entirely out of contact with the ends of the two teeth above mentioned, and at which juncture or time also he elevates the outer end of the handle E, which, by aid of the pawl J operating against one of the two projections Y Z, raises the rake sufficiently to have the points of the forward series of teeth catch hold of the earth, from which point in its elevation the pulling of the draught animal draws the rake over, and which thereby allows the outer end of the handle E to be lowered to its usual position again, the rake to perform a half revolution and to leave the hay at the point desired. During this half revolution the attendant draws backward the left-hand end of the lever M, which movement of the same, through the medium of the connection O, puts forward the lower part or end of the standard K to a position in which it is in readiness to arrest the rotation of the rake by descending upon the outer ends of the next two teeth to be met. But at the same instant that the lower end or foot of the standard K meets with the above-mentioned teeth, and causes the revolution to stop, the pawl J, by its own weight, drops down behind one of the two projections Y or Z, and guards thus against any retrograde movements or turning of the parts in the wrong direction.

The scale upon which the drawings were made is one-eighth of an inch to the inch.

Having now fully described my improvements. what I claim as my invention, and desire to secure by Letters Patent, is—

1. The pivoted pendant or standard K, applied to a single-handled revolving rake, and operated by means of lever M and connecting-rod O, substantially as and for the purpose herein set forth.

2. The lever M, connection O, pivoted pendant or standard K, pawl J, and stops or projections Y and Z, in combination with a single-handled revolving rake, substantially as and for the purpose herein set forth.

JOHN B. LUCE.

Witnesses:
　WILLIAM H. POWERS,
　WM. H. NORTON.